United States Patent [19]
Ishii et al.

[11] Patent Number: 5,385,513
[45] Date of Patent: Jan. 31, 1995

[54] TRANSMISSION ASSEMBLY WITH SEPARATEABLE HALVES DIFFERENTIAL CASING WITH GEARS AND CLUTCH MOUNTED ON CASING FOR VEHICLES

[75] Inventors: Norihiro Ishii, Itami; Toshiyuki Hasegawa, Ashiya; Atsuo Yoshina, Yao; Masaru Iida, Itami, all of Japan

[73] Assignee: Kanzaki Kokyukoki Mfg. Co., Ltd., Amagasaki, Japan

[21] Appl. No.: 9,684

[22] Filed: Jan. 27, 1993

[51] Int. Cl.⁶ .................... F16H 1/40; F16H 37/08
[52] U.S. Cl. .................... 475/203; 475/198
[58] Field of Search .............. 475/198, 200, 203; 192/20; 74/420

[56] References Cited

U.S. PATENT DOCUMENTS

| | | | |
|---|---|---|---|
| 2,183,667 | 12/1939 | Buckendale | 425/203 |
| 2,454,685 | 11/1948 | Avila | 475/203 |
| 2,460,295 | 2/1949 | Keese | 475/203 |
| 2,831,372 | 4/1958 | Boughner | 475/203 |
| 2,858,713 | 11/1958 | Brownyer | 475/203 |
| 3,095,759 | 7/1963 | Herrod | 475/203 |
| 5,046,994 | 9/1991 | Hasegawa et al. | 475/83 |
| 5,142,940 | 9/1992 | Hasegawa | 74/606 |
| 5,149,308 | 9/1992 | Nakamura et al. | 475/203 |

FOREIGN PATENT DOCUMENTS

| | | | |
|---|---|---|---|
| 561781 | 5/1960 | Belgium | 475/203 |
| 1-167921 | 11/1989 | Japan . | |
| 403219150 | 9/1991 | Japan | 475/203 |

Primary Examiner—Dirk Wright
Assistant Examiner—Khoi Q. Ta

[57] ABSTRACT

Within a vehicle transmission casing (11), a plurality of speed-reducing and -changing gear trains are disposed between a drive shaft (12), which extends laterally of the transmission casing, and a differential gearing (13) for driving left and right wheel axles (15) differentially. The gear trains are composed of plural gears (17, 18; 117, 118, 119), which are fixedly mounted on the drive shaft, and another plural gears (20, 21; 120, 121, 122) which are rotatably mounted on a differential casing (14) of the gearing and mesh respectively with the gears on the drive shaft. A clutch member (23; 123) is disposed on the differential casing for coupling the gears thereon one at a time to this casing. The gears on the differential casing are preferably mounted on this casing through sleeve members (24a, 25b) which may be integral with a collar member (24) for supporting the clutch member slidably but non-rotatably relative to the differential casing. A compactness of the transmission assembly is attained while securing large speed-reducing ratios at the gear trains.

5 Claims, 11 Drawing Sheets

TRANSMISSION ASSEMBLY WITH SEPARATEABLE HALVES DIFFERENTIAL CASING WITH GEARS AND CLUTCH MOUNTED ON CASING FOR VEHICLES

FIELD OF THE INVENTION

This invention relates to a transmission assembly adapted for use in a relatively small-scaled vehicle such as a mower tractor. More particularly, the present invention relates to a transmission assembly for vehicles comprising a transmission casing which includes a drive shaft extending laterally of the transmission casing and a differential gearing adapted to drive left and right wheel axles differentially. The differential gearing has a differential casing which is driven to rotate by the drive shaft set forth above.

BACKGROUND OF THE INVENTION

Typical examples of the transmission assembly for vehicles of the type set forth above are disclosed in U.S. Pat. Nos. 5,046,994 and 5,142,940. In each of the transmission assemblies disclosed in these U.S. patents, there is provided a hydrostatic transmission for changing the traveling speed of vehicle non-stepwisely. A fluid motor of the hydrostatic transmission is mounted on a front surface of a transmission casing, and the input of vehicle-driving power into the transmission casing is made from the motor shaft through a bevel gearing. The transmission assembly disclosed in U.S. Pat. No. 5,064,994 is further fashioned such that two-stage speed-change transmission is achieved in the transmission casing. For this, a drive shaft which extends within the transmission casing laterally of the casing has thereon a freely rotatable, hollow input shaft to which power is transmitted from the motor shaft set forth above. The transmission casing further includes in it an intermediate shaft, extending parallel to the drive shaft, and a speed-reducing gear train which is operable to transmit rotation of the input shaft to the drive shaft through the intermediate shaft. A first speed rotation of the drive shaft is attained by obtaining the operated condition of the speed-reducing gear train by means of a clutch member which is slidably but non-rotatably mounted on the drive shaft, whereas a second speed rotation of the drive shaft is attained by coupling this drive shaft directly to the input shaft using the clutch member set forth above. It is fashioned that the rotation of drive shaft is transmitted to the differential casing of a differential gearing with a reduced speed of rotation. On the other hand, the transmission assembly disclosed in U.S. Pat. No. 5,142,940 is fashioned such that power is transmitted from the motor shaft directly to a drive shaft, extending laterally of the transmission casing, and then to a differential casing through a speed-reducing gearing so that no speed-change transmission is made within the transmission casing.

Even in a transmission assembly including a hydrostatic transmission which permits a non-stepwise change of the traveling speed of vehicle, it is desirable to transmit the rotation of motor shaft of the hydrostatic transmission to a differential gearing and wheel axles with a largely reduced speed of rotation. This is because the rotational speed of motor shaft is relatively unstable at a low speed range of the hydrostatic transmission so that it is desirable to use this transmission at its higher speed range for assuring a stable traveling speed of vehicle. In this case, it is also desirable to construct the transmission assembly such that it permits not only a speed reduction but a stepwise change of two or more change stages so that two or more speed ranges of vehicle can be set at the transmission assembly. Of the transmission assemblies shown in the two U.S. patents referred to above, the one disclosed in U.S. Pat. No. 5,064,994 is superior in this point. This transmission assembly includes, however, relatively many gears and the additional intermediate shaft so that a relatively large manufacturing cost is required. Further, the additional intermediate shaft and the speed-reducing gear train associated therewith will enlarge the scale of transmission assembly.

From this, it may be considered to employ a speed-change gear mechanism known from, for example, JP,U No. 1-167921 which permits to transmit the rotation of a drive shaft, disposed laterally within the transmission casing, to a differential gearing with two or more reduced speeds of rotation. The known mechanism is, however, fashioned such that gears of the driving side of speed-change gear trains are rotatably mounted on the drive shaft so as to be coupled selectively to the drive shaft by clutch means. This clutch means prevents gears of the driving side from being reduced in diameter so as to highten speed-reducing ratios at the change mechanism. Consequently, the known mechanism does not permit a large reduction of rotational speed at the transmission path between the drive shaft and differential gearing. In the transmission assembly shown in the Japanese publication referred to above, speed-reducing gear trains are further provided between left and right output shafts of the differential gearing and left and right wheel axles for assuring a large reduction of rotational speed. In a speed-change gear mechanism which also functions as a speed-reducing mechanism, it is preferred to associate a shifting clutch mechanism to gears of the driven side, which are driven to rotate at reduced speeds of rotation, for avoiding shock caused during a shifting operation and for protecting elements of the mechanism from being damaged. The known mechanism is disadvantageous from this respect, too.

Accordingly, a primary object of the present invention is to provide a novel transmission assembly for vehicles in which a speed-change mechanism which performs a speed-change transmission from a drive shaft, extending laterally within a transmission casing, to a differential gearing with largely reducd speed ratios is provided in a cost-saving, scale-reducing and shock-avoiding manner.

SUMMARY OF THE INVENTION

The present invention relates to a transmission assembly for vehicles comprising a transmission casing which includes a drive shaft extending laterally of the transmission casing and a differential gearing having a differential casing which is driven to rotate by the drive shaft. The differential gearing is adapted to drive left and right wheel axles differentially.

According to the present invention, a plurality of speed-reducing and -changing gear trains are disposed between the drive shaft and the differential gearing. The gear trains are composed of plural gears, fixedly mounted on the drive shaft, and plural gears rotatably mounted on the differential casing and meshing respectively with the gears on the drive shaft. An annular clutch member, which is operable to couple the gears on the differential casing one at a time to the differential casing, is slidably but non-rotatably disposed on the differential casing.

Consequently, the differential casing may be driven to rotate at any one of plural rotational speeds by coupling one of the plural gears on the differenteal casing to this casing selectively using the clutch member.

Owing to the structure that, while gears of the driven side of the plural gear trains are rotatably mounted on the differential casing so that the shifting operation is performed by means of the clutch member on the differential casing, gears of the driving side of the plural gear trains are fixedly mounted on the drive shaft, the clutch member no longer prevents these gears of the driving side from being reduced in diameter so that diameter-reduced gears may be employed as gears of the driving side without any difficulty whereby speed-reducing ratios may be hightened. In the transmission assembly according to the present invention, any additional shaft other than the drive shaft is not employed, the number of gears employed is the minimum, namely two times of the change ratios obtainable, and the shifting clutch member for coupling large diameter gears of the driven side requires no complicated structure. Consequently, manufacturing cost for the transmission assembly may be kept low and the speed-reducing and -changing mechanism may be designed in a compact fashion so as not to require any additional space. Although a speed-reducing and -changing mechanism to be disposed between the drive shaft and differential gearing may possibly be fashioned such that it comprises a shifting clutch member still on the drive shaft while speed-reducing ratios are kept large, such mechanism will complicate structure associated with the drive shaft very much. This will be detailed later by referring to FIG. 14.

The plural gears to be mounted rotatably on the differential casing are preferably mounted on this casing through sleeve members. In this case, precise meshment between gears is assured by the sleeve members so that it is unnecessary to apply a quench hardening process to the differential casing, having a large size and a complicated shape, for the purpose of avoiding a distortion of the casing so as to assure such precise meshment of gears. This will save cost further.

In the case where two of the speed-reducing and -changing trains are provided, the two gears on the differential casing are preferably arranged adjacent to both ends of this casing with the clutch member being sandwiched between them. When this is done, load of the two gears are supported by the differential casing at its two portions, which are located near the both side walls of this casing and are thus large in strength, so that the two gears are properly kept in posture.

In addition to such arrangement of the two gears and clutch member, it is preferred that a collar member which supports the clutch member slidably but non-rotatably is disposed between the two gears and is fixedly mounted on the differential casing and that the collar member is formed integrally at its both side ends with a pair of sleeve members through which the two gears are mounted on the differential casing. According to this structure, the collar member for supporting the clutch member slidably but non-rotatably on the differential casing and the pair of sleeve members for keeping a precise meshment between gears are made to a single element so that elements of the change mechanism are reduced in number whereby assembly of the mechanism is made easier.

For the purpose of easier assembly of not only the change mechanism but the differential gearing, the differential casing may be composed of separate left and right casing halves which are fastened together with the collar member therebetween. According to this structure, assembly of the differential gear mechanism into the differential casing can be carried out very easily and, when the casing halves are fastened together, the assembly of the differential gearing having on its casing various elements of the change mechanism is achieved in that condition.

Prevention of a rotational displacement of the collar member relative to the differential casing may be attained by means of separate engaging elements, such as keys, which are disposed between the casing and collar member. But, for the purpose of reducing the number of elements for an easier assembly, it is preferred that each of the casing halves and the collar member include integrally formed engaging portions which engage each other so as to prevent a rotational displacement of the collar member relative to the differential casing.

The differential gearing including plural speed-change gears on its casing has a pretty large diameter as a whole, whereas circumferential space occupied by the drive shaft and plural smaller speed-change gears thereon is relatively small. From this, it is preferred that the drive shaft and differential gearing are arranged such that central axes of these shaft and gearing are offset from each other in the forward and backward direction so as to provide a space within the transmission casing at one side, as viewed in the forward and backward direction, of the drive shaft. And, a shifter member for operating the clutch member to slide is preferably supported by a support shaft which is disposed within the space set forth above and extends laterally of the transmission casing. When such arrangement is employed, both of the drive shaft and shifter-support shaft may be disposed within the forward and backward width of the differential gearing having a relatively large diameter as a whole. This contributes to employment of a compact transmission casing which includes in it no substantial spare space.

BRIEF DESCRIPTION OF THE DRAWINGS

The present invention and its attendant advantages will become more readily apparent as the specification is considered in conjunction with the accompanying drawings in which.

DESCRIPTION OF PREFERRED EMBODIMENTS

Figure 4:
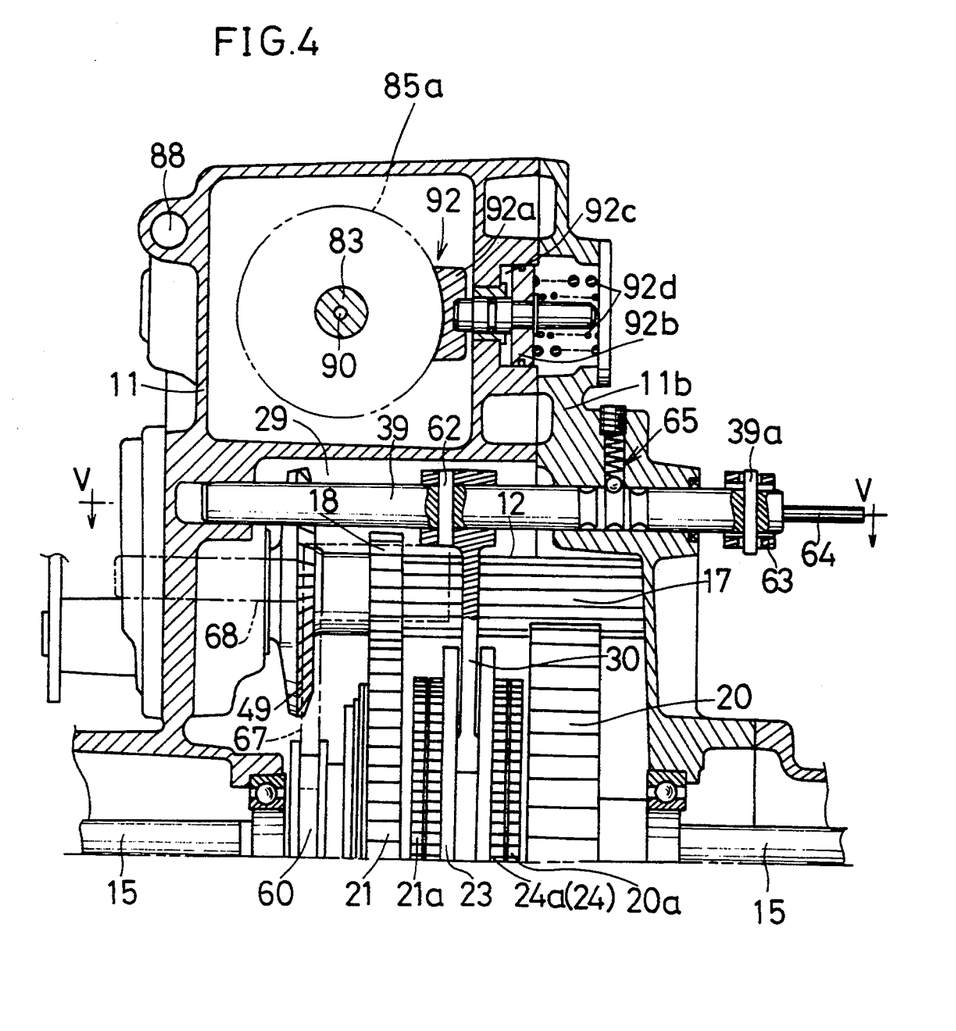
FIG. 4 is a fragmentary sectional view taken generally along line IV—IV of FIG. 2.
Figure 5:
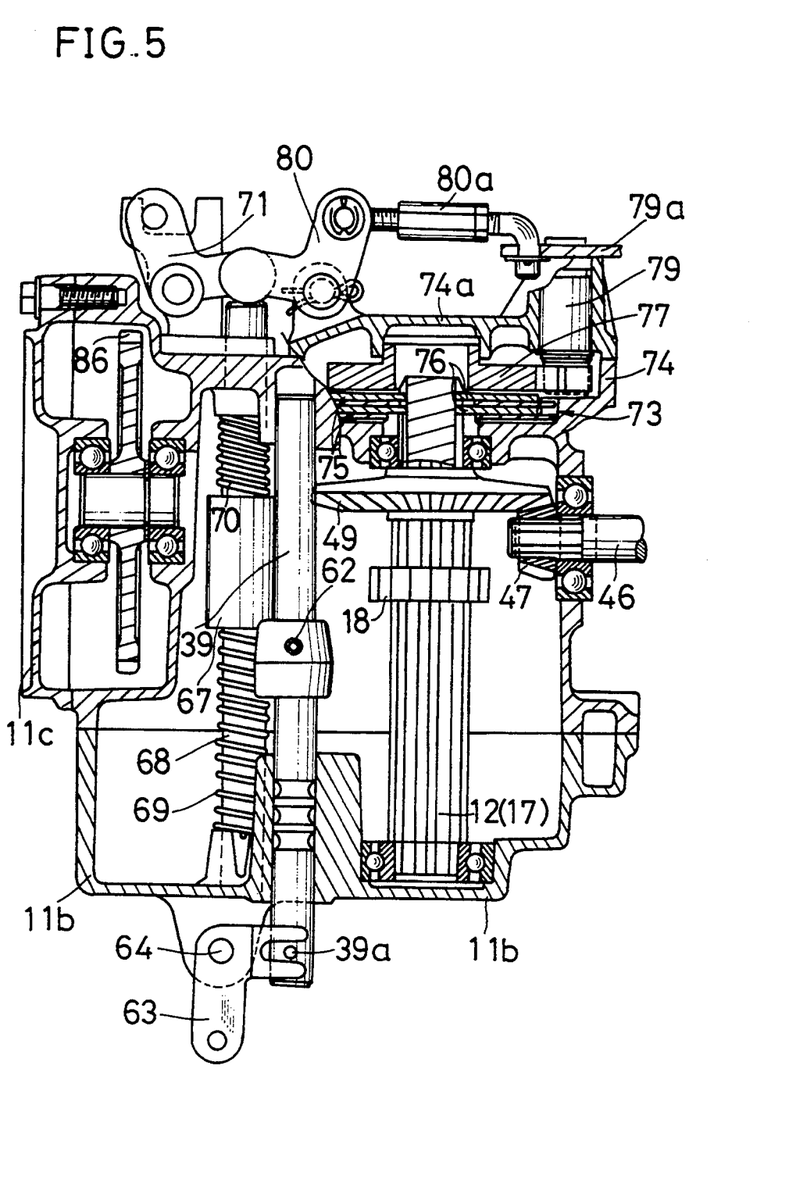
FIG. 5 is a cross-sectional view taken generally along line V—V of FIG. 4.
Figure 6:
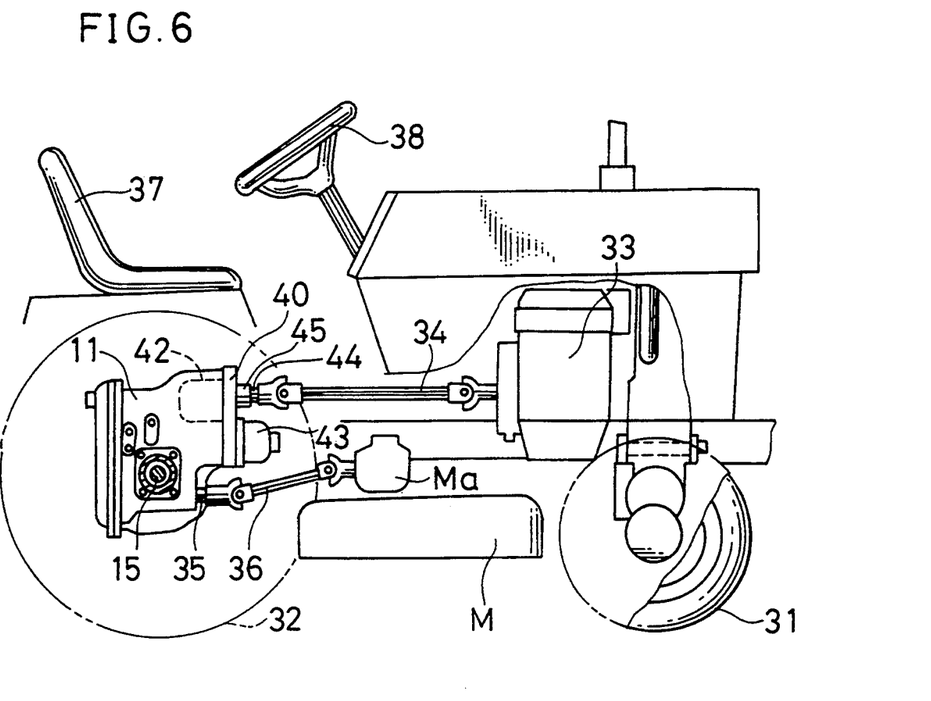
FIG. 6 ia a schematic side view, partially cut away and partially in section, of a mower tractor in which the transmission assembly shown in FIGS. 1 to 5 is employed.

FIGS. 1 to 5 show a first preferred embodiment and FIG. 6 shows a mower tractor in which the first embodiment is employed. The tractor shown is adapted to be equipped with a mower M at an underside of the vehicle and between paired front wheels 31 and rear wheels 32.

As shown in FIG. 6, an engine 33 as a drive source is mounted on a front portion of the vehicle. Between the left and right wheels 32, a transmission casing 11 is disposed which supports wheel axles 15 of the left and right rear wheels 32. Power of the engine 33 is transmitted into the transmission casing 11 through a transmission shaft 34 extending axially of the vehicle, and the left and right rear wheels 32 are driven to rotate so as to travel the vehicle. A mid-PTO shaft 35 extends forwardly at a low level from the transmission casing 11 and is adapted to transmit mower-driving power into a gear box Ma of the mower M through a transmission shaft 36. A seat 37 is disposed above the transmission casing 11, and a steering wheel 38 for providing steering turns to the left and right front wheels 31 is located before the seat 37.

Figure 2:
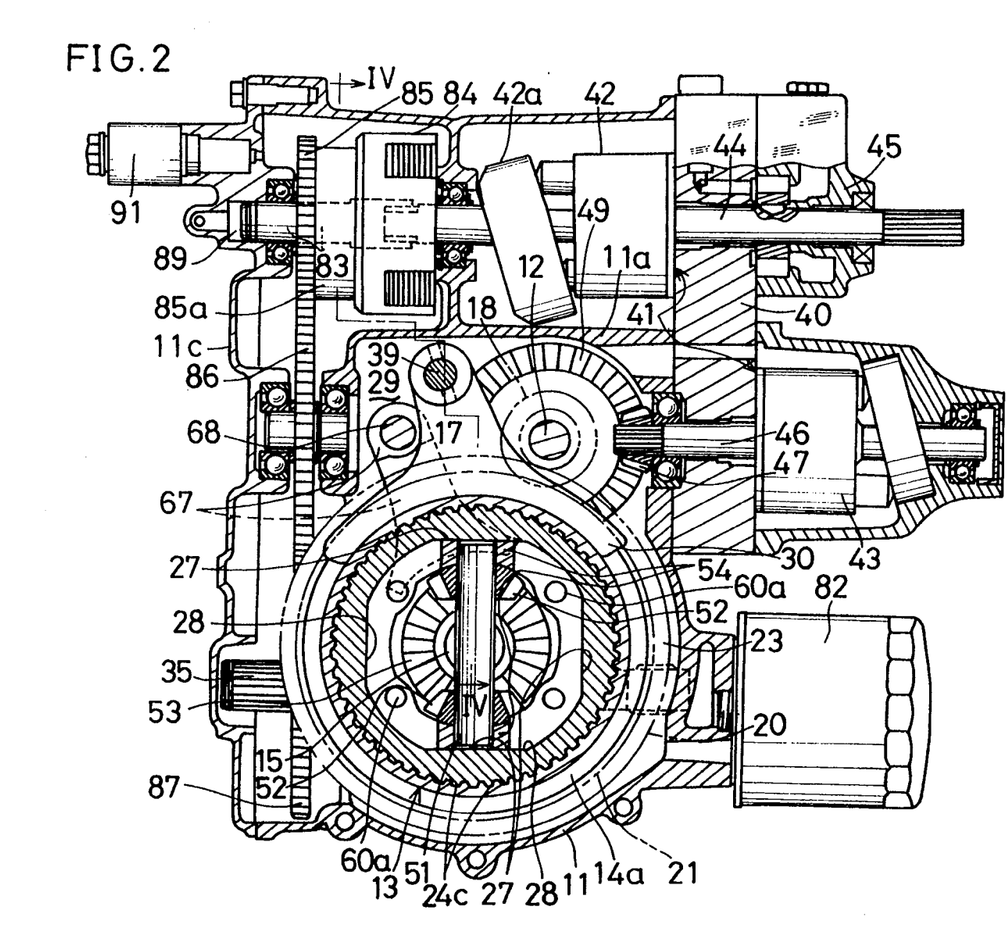
FIG. 2 is a sectional side view, partially developed, of the transmission casing shown in FIG. 1.

As shown in FIGS. 2 and 6, a plate member 40 having a relatively large thickness is secured to a front of the transmission casing 11. A hydrostatic transmission 41 is provided and comprises a hydrulic pump 42 of a variable displacement type, which is mounted on a rear surface of an upper half of the plate member 40 and is located at an upper portion within the transmission casing 11, and a hydraulic motor 43 of a fixed displacement type which is mounted on a front surface of a lower half of the plate member 40 and is located outside the transmission casing 11. A fluid pump 45, which is fashioned to a trochoid pump by employing pump shaft 44 of the hydraulic pump 42 as a pump drive shaft is mounted on a front surface of the plate member 40, and the pump shaft 44 is coupled to the transmission shaft 34 at a location before the fluid pump 45. Motor shaft 46 of the hydraulic motor 43 extends backwardly through the plate member 40 into the transmission casing 11 and carries at its rear end a small bevel gear 47. As will be detailed later, the pump shaft 44 is adapted to drive also the mid-PTO shaft 35.

Figure 1:
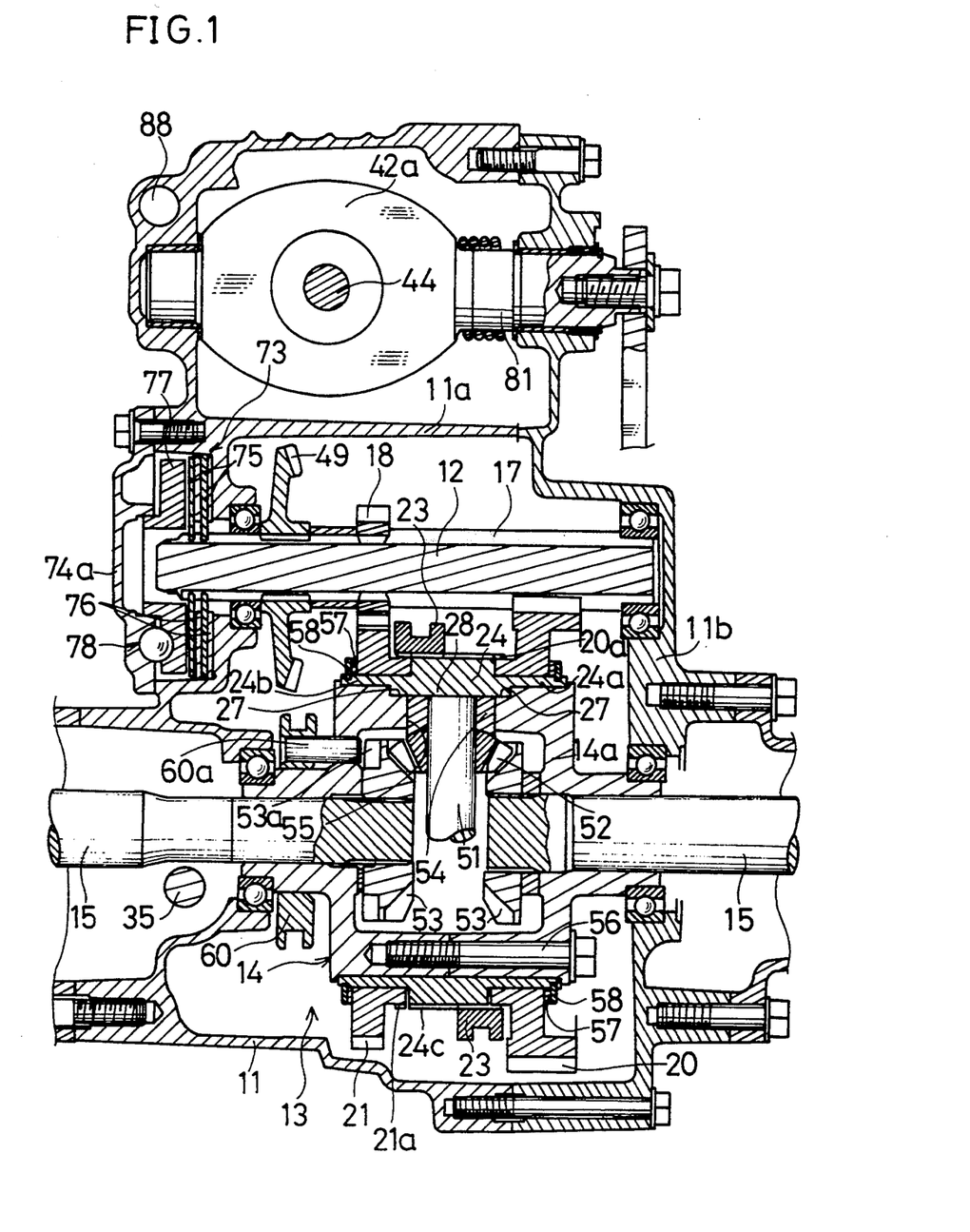
FIG. 1 is a sectional rear view, partially developed, of a transmission casing of a tractor in which a first embodiment of the transmission assembly according to the present invention is employed.

As shown in FIGS. 1 and 2, a partition wall 11a which is integral with the transmission casing 11 is provided so as to divide the interior of the casing 11 into a space for accomodating the hydraulic pump 42 and another space for accomodating the vehicle-driving mechanism. Below the partition wall 11a, a drive shaft 12 is disposed within the transmission casing 11 and extends laterally of this casing. At an underside of the drive shaft 12, a differential gearing 13 is disposed within the transmission casing 11 such that the center axis of this gearing 13 is offset backwardly from that of the drive shaft 12. The drive shaft 12 carries at its one end portion a large bevel gear 49, which meshes with the bevel gear 47, so that the drive shaft 12 is driven to rotate by the motor shaft 46 at a reduced speed of rotation. The differential gearing 13 is constructed by employing left and right wheel axles 15 as its output shafts and is operable to drive the left and right wheel axles differentially.

As also shown in FIGS. 1 and 2, there are disposed between the drive shaft 12 and differential gearing 13 two speed-reducing and -changing gear trains which are composed, according to the present invention, of two gears 17 and 18, which are fixedly mounted on the drive shaft 12, and another two gears 20 and 21 which are rotatably mounted on a differential casing 14 of the gearing 13 and mesh respectively with gears 17 and 18 on the drive shaft. Of the two gears 17 and 18 on the drive shaft 12, the smaller gear 17 is formed integrally with the shaft 12 in a spline-like fashion. The two gears 20 and 21 on the differential casing 14 are disposed adjacent to the side ends of this casing 14 and includes at their boss portions, extending toward each other, splines 20a and 21a. Between these gears 20 and 21, a collar member 24 is fixedly mounted on the differential casing 14. This collar member 24 includes at its outer surface splines 24c which are aligned with the splines 20a and 21a of the gears 20 and 21. Collar member 24 further has at its both ends a pair of left and right integral sleeve members 24a and 24b through which gears 20 and 21 are rotatably mounted on the differential casing 14. An annular clutch member 23 is spline-fitted slidably but non-rotatably on the collar member 24 using splines 24c. This clutch member 23 may be displaced selectively to a neutral position where splines on its inner surface engage only splines 24c of the collar member 24, a first speed position where splines on its inner surface engage, as shown in the lower side of FIG. 1, both of the splines 24c of collar member 24 and splines 20a of gear 20 so as to couple the gear 20 to the differential casing 14 through the collar member 24, and a second speed position where splines on its inner surface engage, as shown in the upper side of FIG. 1, both of the splines 24c of collar member 24 and splines 21a of gear 21 so as to couple the gear 21 to the differential casing 14 through the collar member 24.

Figure 3:
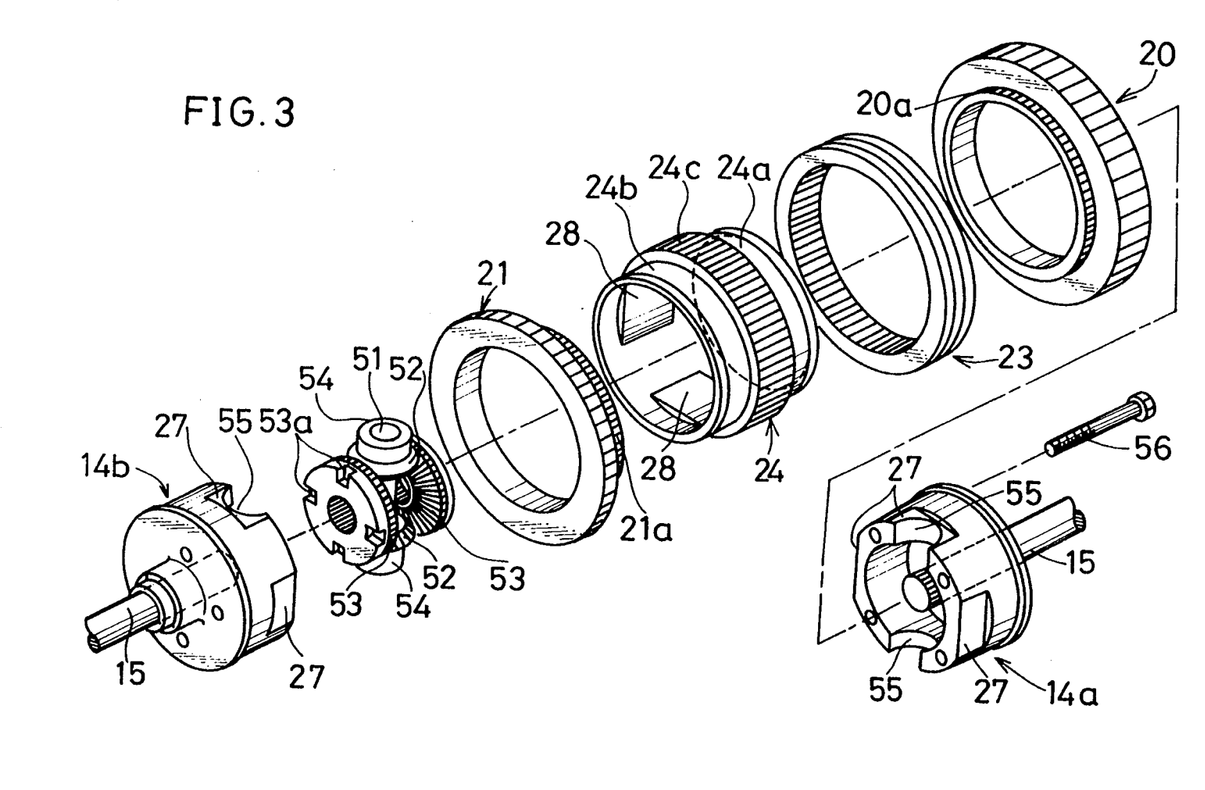
FIG. 3 is a schematic perspective view showing various members of a differential gearing shown in FIGS. 1 and 2.

More specifically, the differential casing 14 employed in the first embodiment is composed, as shown in FIGS. 1 and 3, of separate left and right casing halves 14a and 14b. The inner surface of collar member 24 has thereon integrally formed four engaging protrusions 28 which are arranged intermittently in the circumferential direction. These engaging protrusions 28 are adapted to fit in engaging recesses 27 formed in the outer surface of each casing half 14a, 14b. As is conventional, the differential gearing 13 comprises a pair of pinion gears 52 (one of which is omitted in FIG. 1), mounted rotatably on a pinion shaft 51, and a pair of side gears 53, mounted fixedly on the left and right wheel axles 15, which mesh with one another as shown. Both end portions of the pinion shaft 51 are supported by the differential casing 14 through bushings 54 which are embraced by respective semi-circular receiving recesses 55 formed in the respective casing halves 14a and 14b. Both casing halves 14a and 14b are fastened together by bolts 56, which extend through casing half 14a and are threadingly engaged to casing half 14b, in a condition where the engaging protrusions 28 of collar member 24 are fitted in the engaging recesses 27 of casing halves 14a, 14b and the bushings 54 are embraced by the receiving recesses 55 of casing halves 14b, 14b and where the collar member 24 is sandwiched between the casing halves 14a and 14b. By this, the collar member 24 is mounted on the differential casing 14 in a state where a rotational displacement of the collar member 24 relative to the casing 14 is prevented due to engagement between the engaging recesses 27 and engaging protrusions 28. As shown in FIG. 1, getting-away of gears 20 and 21 from the sleeve members 24a and 24b is prevented by rings 57 and circlips 58 on the sleeve members.

As shown in FIG. 1, a differential-locking clutch 60 is slidably mounted on a boss portion of the casing half 14b and has locking pins 60a which extend through a side wall of the casing half 14b and may be projected into recesses 53a in the boss of the differential side gear 53 of one side. This clutch 60 is operable to disable the differential gearing 13 by locking the side gear 53 to the differential casing 14.

As shown in FIGS. 2 and 4, the clutch member 23 is operated to slide by a fork-shaped shifter member 30 which engages the clutch member. A support shaft 39 for supporting this shifter member 30 is disposed particularly within a space 29 which is afforded above the differential gearing 13 and behind the drive shaft 12 owing to the arrangement, referred to before, that the central axis of differential gearing 13 is offset backwardly from that of drive shaft 12, and extends laterally of the transmission casing 11. In the embodiment shown, the support shaft is slidably supported by the transmission casing 11 and the shifter member 30 is fixedly secured to this shaft 39 using a pin 62. As shown in FIGS. 4 and 5, one end of the support shaft 39 extends out of the transmission casing 11 through a side cover 11b of this casing and has an operating pin 39a secured thereto. A bell crank-shaped shifter arm 63 engageable to the pin 39a is rotatably supported by a bracket on the outer surface of side cover 11b through a vertical pin 64. The shifter arm 63 is operated to rotate by a change lever not shown in the drawings and operates the support shaft 39 to slide through the operating pin 39a whereby the shifter member 30 is displaced so as to provide a sliding displacement of the clutch member 23 on the collar member 24. Between the support shaft 39 and side cover 11b, detent means 65 is disposed which is operable to latch the clutch member 23 at its neutral position, first speed position and second speed position referred to before.

As shown in FIG. 2, another support shaft 68 extending laterally of the transmission casing 11 is also disposed within the space 29 and supports a clutch fork 67 for operating the differential-locking clutch 60. This shaft 68 is also slidably supported by the transmission casing. As shown in FIG. 5, the clutch fork 67 is slidably mounted on the shaft 68 and is biased to move into one and the other axial directions by a pair of coil springs 69 and 70 disposed on the shaft 68. One end of the support shaft 68 extends, at the opposite side of the support shaft 39, out of the transmission casing 11. A rotatable clutch arm 71 supported on an outer side surface of the transmission casing 11 engages to the outer end face of support shaft 68. The clutch arm 71 is operated to rotate by a clutch pedal not shown in the drawings so as to push the shaft 68 into the transmission casing 11. When the locking pins 60a and engaging recesses 53a shown in FIG. 1 are not properly aligned, the coil spring 70 is once compressed so as to store clutch-operating force and then, when an alignment between pins 60a and recesses 53a is attained, the clutch fork 67 is displaced by the stored operating force so as to provide the required sliding displacement to the differential-locking clutch 60.

As shown in FIGS. 1 and 5, a brake 73 for braking the drive shaft 12 is disposed at one end portion of this shaft 12. This brake 73 is housed in a brake casing 74 formed on an outer side surface of the transmission casing 11 and is fashioned to a frictional type which comprises one frictional elements 75 and another frictional elements 76 supported slidably but non-rotatably by the drive shaft 12 and by brake casing 74. A pressure plate 77 is faced with the frictional elements 75 and 76, and a cam mechanism 78 is disposed between a cover 74a of the brake casing 74 and the pressure plate 77. The pressure plate 77 is adapted to be rotationally displaced by a rotatable control shaft 79 which extends through the cover 74a. Cam mechanism 78 is operable to cause a sliding movement of the pressure plate 77, when this plate 77 is rotationally displaced, toward the frictional elements 75 and 76 so as to cause a frictional engagement between these elements and to thereby actuate the brake 73. A rotatable brake arm 79a is provided for operating the control shaft 79 to rotate, and a rotatable second clutch arm 80 is arranged in a parallel relationship with the clutch arm 71 and is connected to the brake arm 79a through a connecting member 80a. The second clutch arm 80 is adapted to push the support shaft 68, when the brake 73 is operated to actuate same, into the transmission casing 11 so as to operate the differential-locking clutch 60 also in the actuated condition of brake 73.

The hydrostatic transmission 41 referred to before is fashioned such that fluid passages between the hydraulic pump 42 and hydraulic motor 43 and various valves (all not shown) are disposed within the plate member 40 shown in FIG. 2. Control shaft 81 for changing the inclination angle of swash plate 42a of the hydraulic pump 42 extends at its one end out of the transmission casing 11, as shown in FIG. 1. A lower portion of the interior of the transmission casing 11 is used as an oil sump, and a filter 82 for purifying oil flowing from such oil sump to the fluid pump 45 is mounted on a front surface of the transmission casing 11 at a location below the plate member 40. Fluid pump 45 is used for supplementing working fluid to the hydrostatic transmission 41.

As shown in FIG. 2, the pump shaft 44 of hydraulic pump 42 extends backwardly and is connected to a transmission shaft 83, which is disposed co-axially with the pump shaft at an upper level within a rear end portion of the transmission casing 11, through a fluid-actuated PTO-clutch 84. A gear 85 id fixedly mounted on the transmission shaft 83. The mid-PTO shaft 35 referred to before extends backwardly, with passing below the wheel shaft 15 of one side as shown in FIG. 1, to a rearmost portion within the transmission casing 11. As shown in FIG. 2, gear 85 on the transmission shaft 83 is adapted to drive the mid-PTO shaft 35 through an intermediate gear 86 and through a gear 87 fixedly mounted on a rear end portion of the shaft 35. The PTO-clutch is supplied with its actuating fluid also by the fluid pump 45, and a side wall of the transmission casing 11 includes in it a fluid passage 88 shown in FIGS. 1 and 4 for flowing fluid from the pump 45 toward the rear. This passage 88 is communicated to a fluid chamber 89 which is formed, as shown in FIG. 2, between a rear end cover 11c of the transmission casing 11 and the rear end face of transmission shaft 83. Fluid chamber 89 is in turn communicated to the PTO-clutch 84 through a fluid passage 90, shown in FIG. 4, in the transmission shaft 83. As shown in FIG. 2, an electromagnetic valve 91 for cotrolling supply of fluid to the clutch 84 is mounted on the outer surface of rear end cover 11c and is incorporated between fluid passages 88 and fluid chamber 89. As shown in FIG. 4, a brake 92 is associated with the PTO-clutch 84 for braking the driven side of clutch 84 in a disactuated condition of this clutch. This brake 92 comprises a brake shoe 92a which is engageable to a boss portion 85a of the gear 85. The shoe 92a is adapted to advance and retreat by a piston 92b which is disposed within a side wall of the transmission casing 11. The piston 92b which is retreated by clutch-actuating fluid pressure which is applied to a fluid chamber 92c formed at one side of the piston and is advanced by springs 92d. The power take-off mechanism having been detailed hereinbefore is generally identical with the the one disclosed in the aforecited U.S. Pat. No. 5,142,940, the disclosure of which is hereby incorporated herein by reference.

Figures 7, 8:
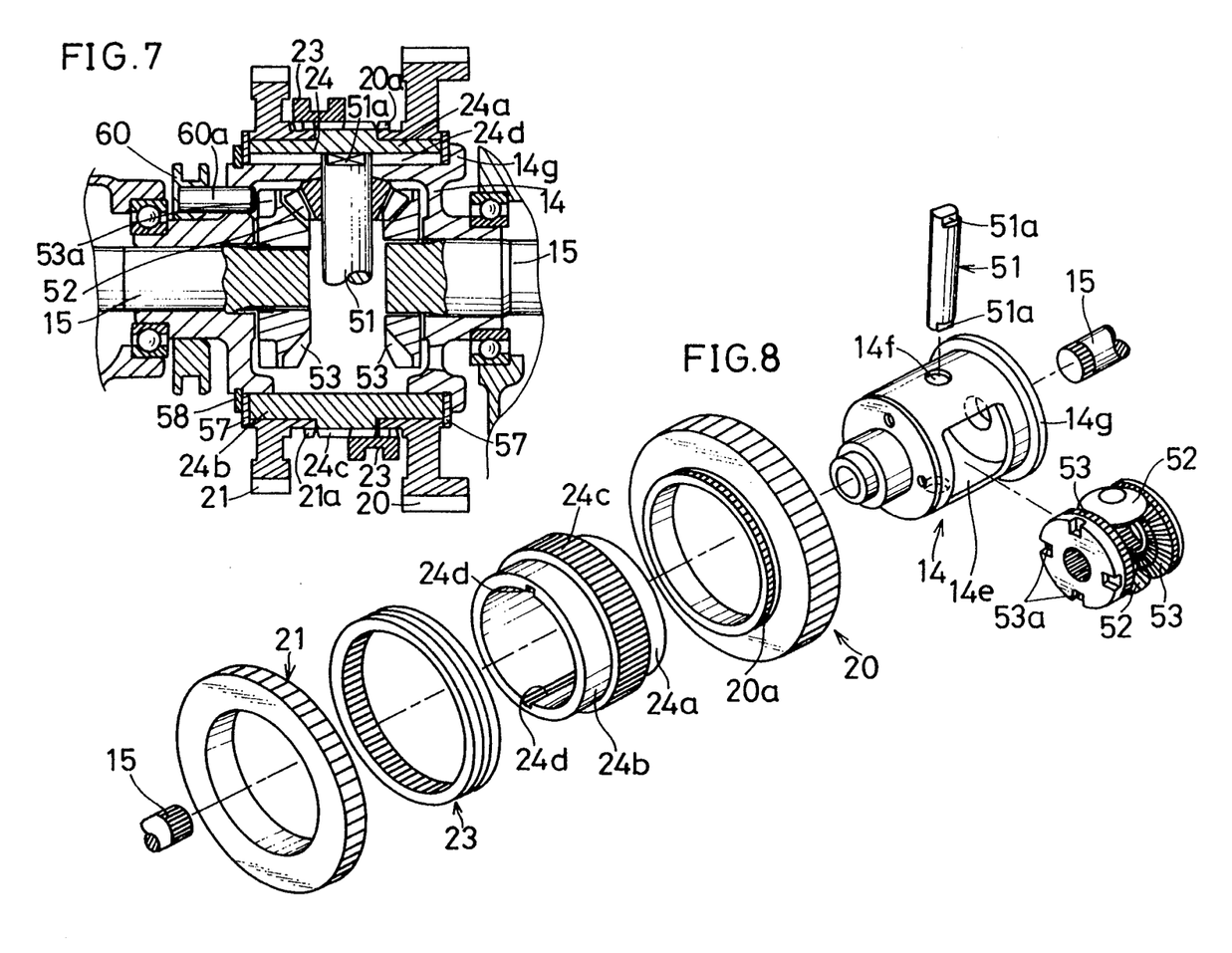
FIG. 7 is a sectional rear view, partially omitted, showing a part of a second embodiment of the transmission assembly according to the present invention.
FIG. 8 is a schematic perspective view showing various parts of a differential gearing shown in FIG. 7.

FIGS. 7 and 8 show a part of a second embodiment. A collar member 24 having at its both ends integrally formed left and right sleeve members 24a and 24b is employed in this embodiment, too, but a differential casing 14 of one piece is adopted. This casing 24 includes an opening 14e for assembling differential gears 52 and 53 into the casing and a pair of bores 14f for receiving the end portions of pinion shaft 51. For preventing a rotational displacement of the collar member 24 relative to the differential casing 14, the pinion shaft 51 is provided at its end portions with flat cut-outs 51a which are fittingly received in a pair of grooves 24d formed in the inner surface of collar member 24. The casing 14 further includes at its one end an annular flange 14g, and the collar member 24 and gears 20 and 21 are mounted on the differential casing 14 so as to be kept axially in position between a ring 57, abutting on the flange 14g, and another ring 57 abutting on a circlip 58 which is snappingly secured on the casing 14. The other parts of the second embodiment are fashioned similarly to the corresponding parts of the first embodiment shown in FIGS. 1 to 5.

Figure 9:
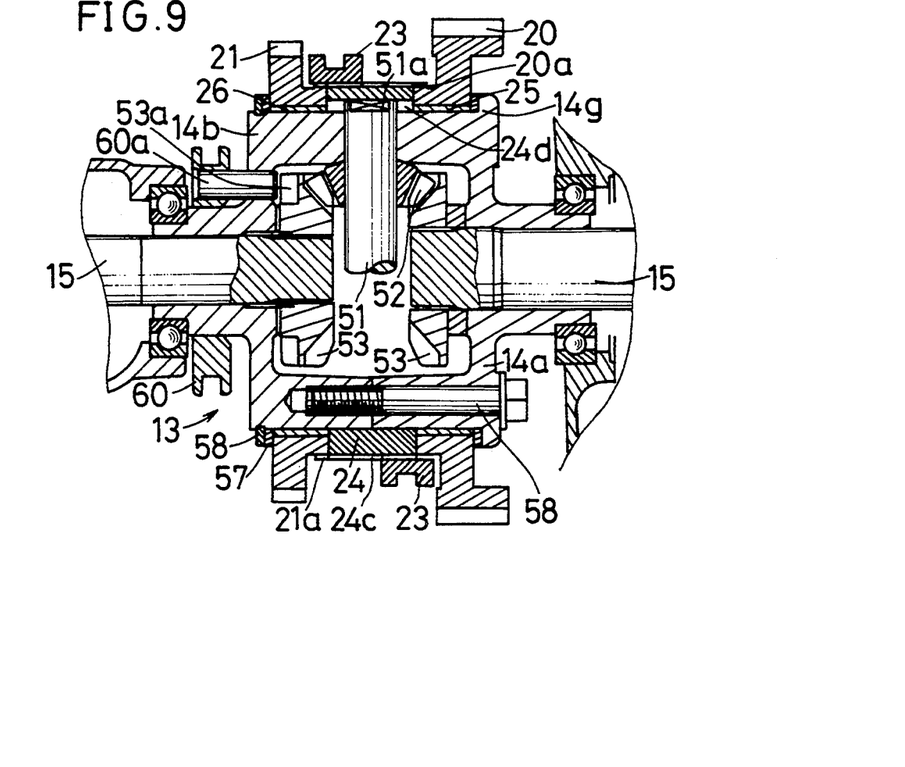
FIG. 9 is a sectional rear view, partially omitted, showing a part of a third embodiment of the transmission assembly according to the present invention.
Figure 10:
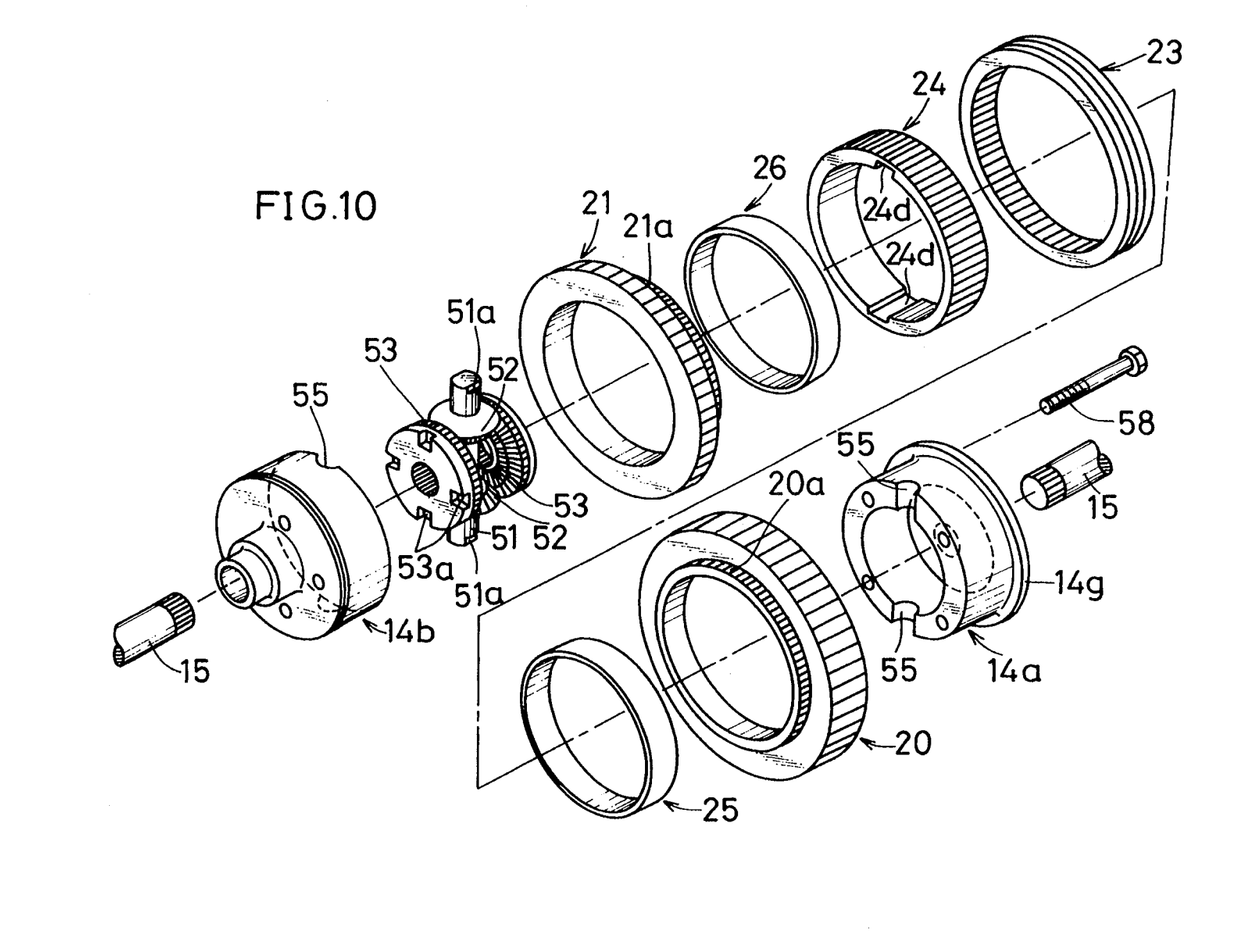
FIG. 10 is a schematic perspective view showing various parts of a differential gearing shown in FIG. 9.

FIGS. 9 and 10 show a part of a third embodiment. Similarly to the first embodiment, differential casing 14 employed in this third embodiment is composed of left and right casing haves 14a and 14b which are fastened together using bolts 58 with a collar member 24 between the casing halves. In the third embodiment, however, gears 20 and 21 are rotatably mounted on the differential casing 14 through a pair of sleeve members 25 and 26 which are provided separately from the collar member 24. Prevention of a rotational displacement of the collar member 24 relative to the casing 14 is attained, similarly in the second embodiment, by fitting flat cut-outs 51a in the end portions of pinion shaft 51 into a pair of grooves 24d in the inner surface of collar member 24. The differential casing 14 is provided at its one end with an integral annular flange 14g which is used for preventing axial displacement of the collar member 24 and gears 20 and 21, as is the case in the second embodiment. The other parts of the third embodiment are fashioned similarly to the corresponding parts of the first embodiment.

Figure 11:
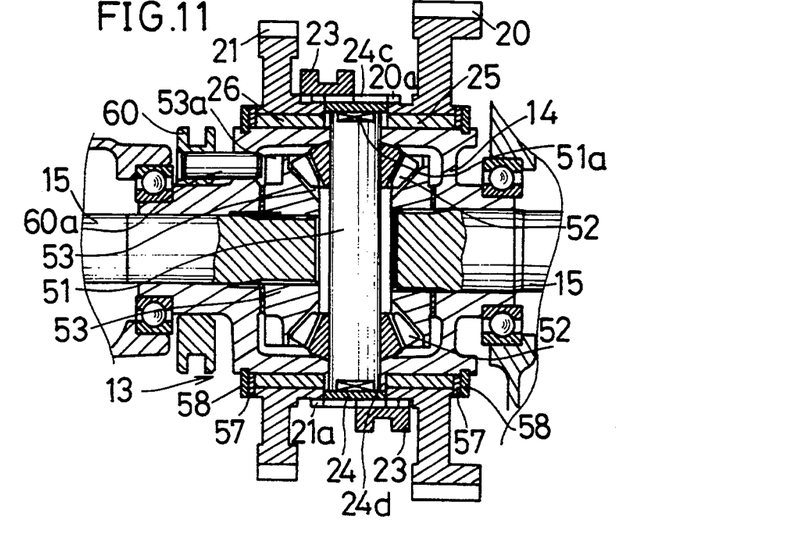
FIG. 11 is a sectional rear view showing a part of a fourth embodiment of the transmission assembly according to the present invention.
Figure 12:
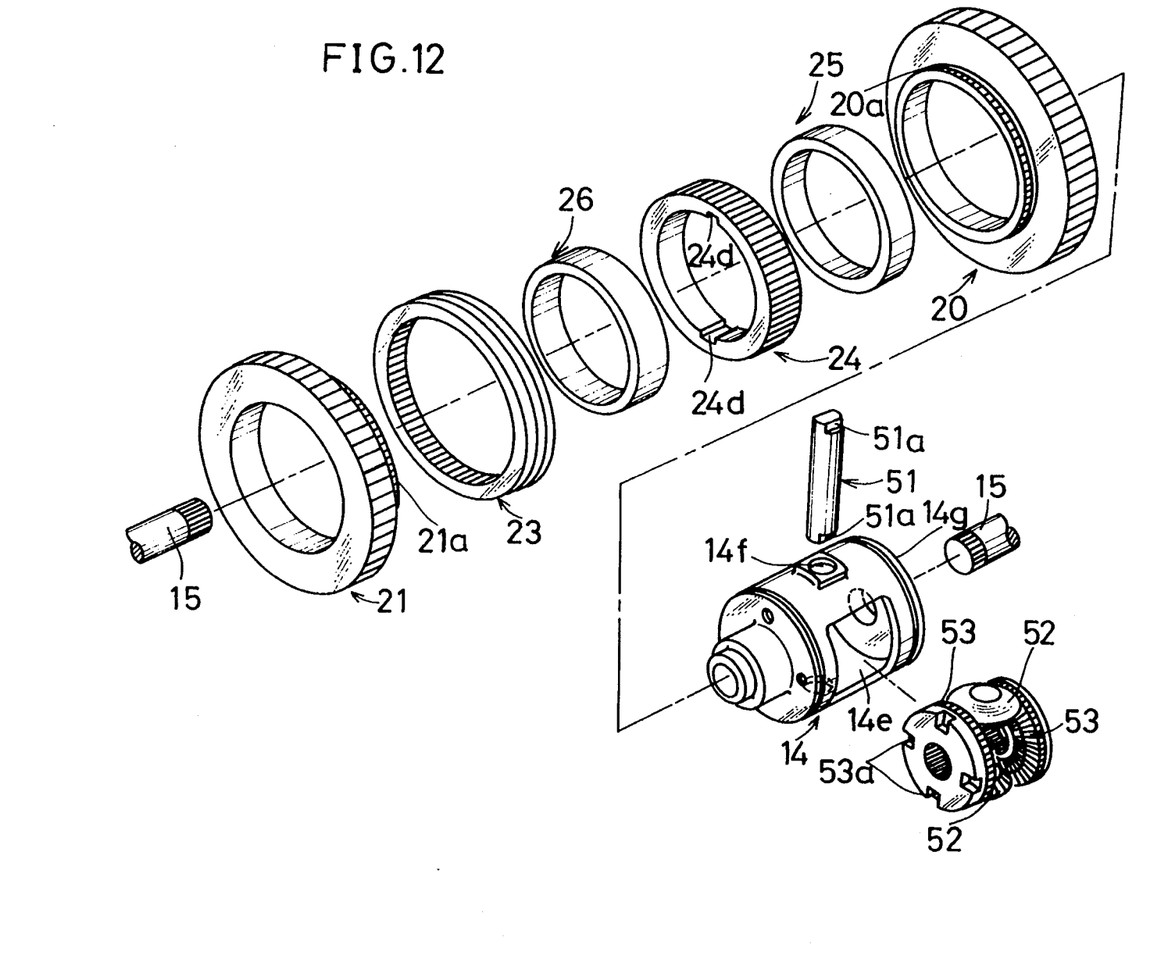
FIG. 12 is a schematic perspective view showing various parts of a differential gearing shown in FIG. 11.

FIGS. 11 and 12 show a part of a fourth embodiment. This fourth embodiment differs substantially from the second embodiment shown in FIGS. 7 and 8 only in that a pair of sleeve members 25 and 26 separate from the collar member 24 are employed for supporting gears 20 and 21 rotatably.

Figure 13:
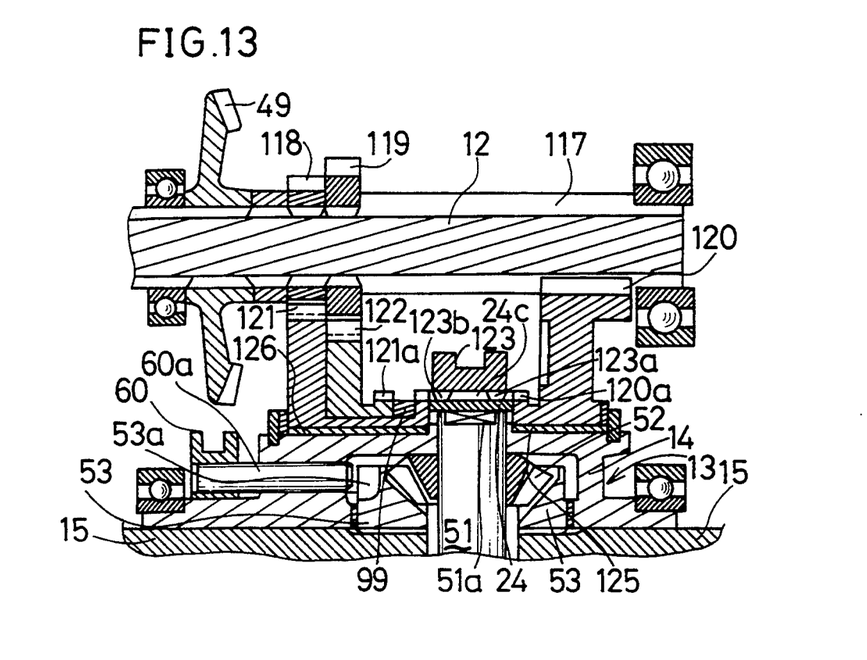
FIG. 13 is a sectional rear view showing a part of a fifth embodiment of the transmission assembly according to the present invention.

FIG. 13 shows a part of a fifth embodiment in which, differently from each of the first to fourth embodiments, three speed-reducing and -changing gear trains are disposed between a drive shaft 12 and differential casing 13. As shown, first to third speed gears 117, 118 and 119 are fixedly mounted on the drive shaft 12. Corresponding first to third speed gears 120, 121 and 122 are rotatably mounted on the differential casing 14 and mesh respectively with gears 117, 118 and 119 on the drive shaft. The first speed gear 117 which is the smallest in diameter of the three gears on the drive shaft 12 is formed, similarly to the first speed gear 17 employed in the first embodiment, integrally with an outer surface of the drive shaft in a spline-like fashion. The second speed gear 118 and third speed gear 119 are disposed adjacent to each other and are spline-connected to the drive shaft 12. The first speed gear 120 on the differential casing 114 is rotatably mounted on this casing through a sleeve member 125, whereas the second speed gear 121 is rotatably mounted on the casing 14 through another sleeve member 126. The third speed gear 122 is rotatably mounted on a boss portion of the second speed gear 121. The differential casing 14 is fashioned similarly to that employed in the fourth embodiment, and a collar member 24 is provided which is supported similarly to the collar member employed in the fourth embodiment. Boss portions of the gears 120, 121 and 122 include splines 120a, 121a and 122a which are aligned with splines 24c on the outer surface of collar member 24. Splines 121a of the second speed gear 121 are disposed at a location nearer to the collar member 24 than splines 122a of the third speed gear 122.

An annular clutch member 123 which is slidable but non-rotatable relative to the collar member 24 and differential casing 14 is mounted on the collar member using splines 24c. This clutch member 123 includes on its inner surface axially divided splines 123a and 123b. Splines 123a are disposed such that they are engageable to both of the splines 24c of collar member 24 and the splines 120a of gear 120 at a same time, whereas splines 123b are disposed such that they are engageable to both of the splines 24c of collar member 24 and the splines 121a of gear 121 at a same time or to both of the splines 24c of collar member 24 and the splines 122a of gear 122 at a same time. Consequently, gears 120, 121 and 122 may be coupled one at a time to the differential casing 14 by operating the clutch member 123 to slide from a neutral position shown in FIG. 13. A spacer ring 99 is disposed between the splines 121a and 122a of gears 121 and 122 for preventing with certainty the splines 123b of clutch member 123 from being engaged to both of the gear splines 121a and 122a.

The other parts of the fifth embodiment shown in FIG. 13 are substantially identical with corresponding parts of the fourth embodiment shown in FIGS. 11 and 12. The number of speed-reducing and -changing gear trains to be disposed between the drive shaft 12 and differential gearing 13 may be made four with ease by mounting an additional gear rotatably on the differential casing 14 at the side of the first speed gear 120 in the fifth embodiment so that the additional gear meshes with another additional gear to be mounted fixedly on the drive shaft 12.

Figure 14:
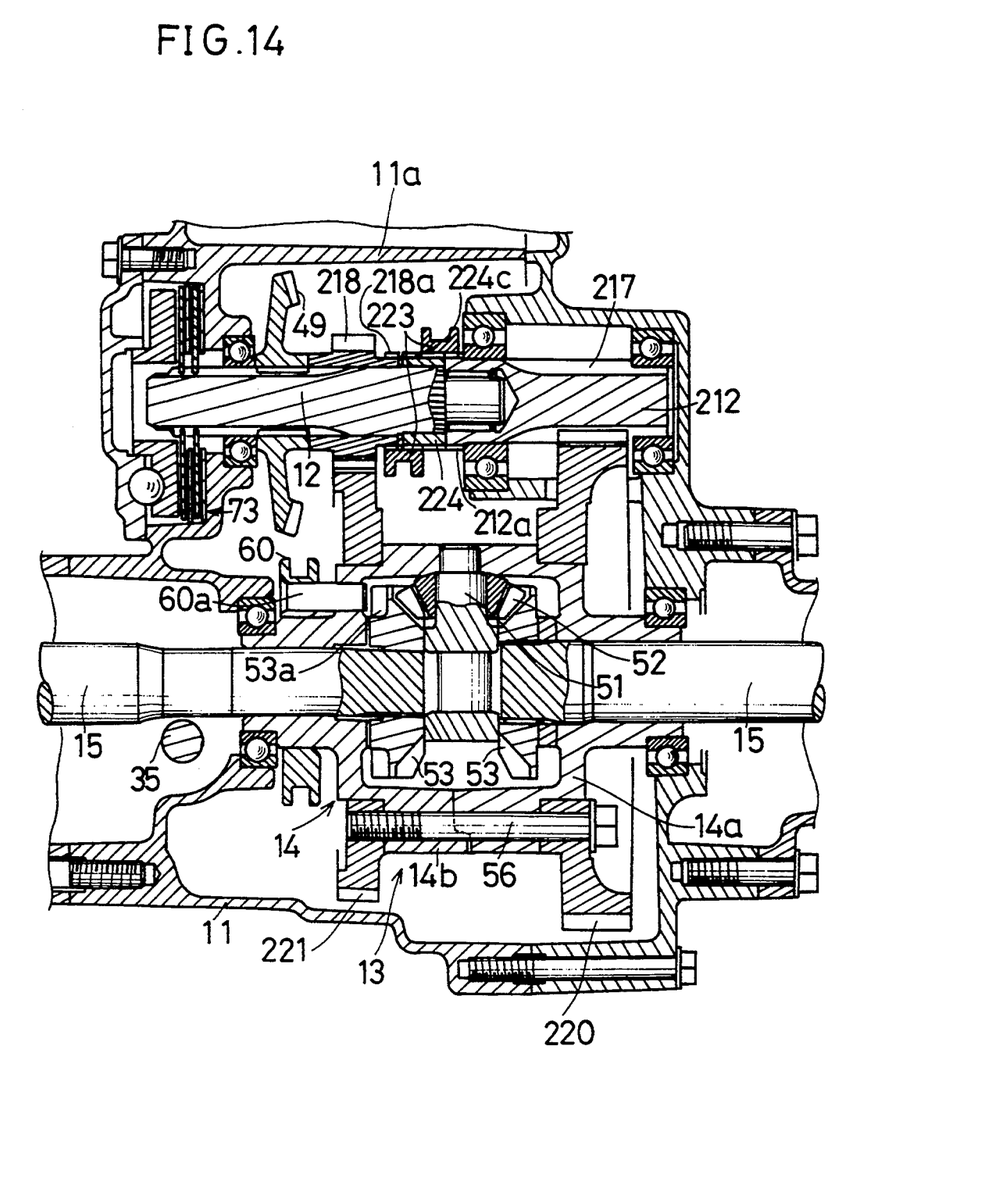
FIG. 14 is a sectional rear view illustrating a vehicle transmission casing, in which a transmission assembly different in structure from the one according to the present invention is employed, for a comparison purpose.

FIG. 14 illustrates a possible structure which attains large speed-reducing ratios between a drive shaft and differential gearing with gears of the driving side being mounted, contrary to the structure according to the present invention, rotatably on the drive shaft. When a small gear corresponding to the gear 17 employed in the first embodiment of the present invention having detailed before were mounted rotatably on the drive shaft 12, such small gear could no longer be coupled to the drive shaft by a clutch member, such as the one 223 shown in FIG. 14. Consequently, in the structure shown in FIG. 14, a second drive shaft 212 having thereon an integral small gear 217 corresponding to the gear 17 is separately arranged co-axially with the drive shaft 12. This second drive shaft 212 is supported so that it is rotatable independently of the drive shaft 12. A gear 218 corresponding to the gear 18 employed in the first embodiment of the present invention is rotatably mounted on the drive shaft 12, and gears 217 and 218 mesh respectively with gears 220 and 221 which correspond to the gears 17 and 18 employed in the first embodiment of the present invention but are fixedly mounted, in the structure shown in FIG. 14, on the differential casing 14. Clutch member 223 is slidably but non-rotatably mounted on a collar member 224, fixedly mounted on the drive shaft 12, using splines 214c on the outer surface of the collar member. One end portion of the second drive shaft 212 and a boss portion of the gear 218 include respectivly splines 212a and 218a which are aligned with splines 224c of the collar member 224. The clutch member 223 is slidingly shiftable from its neutral position to a first speed position, where it engages, as shown in the upper side of FIG. 14, to both of the splines 224c and 212a so as to couple the second drive shaft 212 to the drive shaft 12, and to a second speed position where the clutch member engages, as shown in the lower side of FIG. 14, to both of the splines 224c and 218a so as to couple gear 218 to the drive shaft. In the structure shown in FIG. 14, gears 220 and 221 are secured to the differential casing 14 using bolts 56 for fastening separately formed casing halves 14a and 14b of the differential casing 14. In FIG. 14, numerals same as the ones previously used are used again for designating like parts.

According to the structure shown in FIG. 14, the second drive shaft 212 and supporting structures for it are additionally required so that manufacturing cost is hightened because of increase in number of elements and assembling steps. Furthermore, the second drive shaft 212 or gear 218 is coupled, using the clutch member 223, selectively to the drive shaft 12 having a relatively high speed of rotation so that a relatively large shock is caused during a shifting operation whereby parts or elements of the transmission assembly, such as splined parts or elements, may be damaged in early times of use. As can be understood when the strucure according to the present invention is compared with the one shownin FIG. 14, the advantages of the present invention are noteworthy.

We claim:

1. A transmission assembly for vehicles comprising a transmission casing (11) which includes a drive shaft (12) extending laterally of said transmission casing and a differential gearing (13) having a differential casing (14) which is driven to rotate by said drive shaft, said differential gearing being adapted to drive left and right wheel axles (15) differentially, characterized in:

that two sets of speed-reducing and -changing gear trains are disposed between said drive shaft (12) and said differential gearing (13), said gear trains being composed of two gears (17, 18) fixedly mounted on said drive shaft and another two gears (20, 21) rotatably mounted on said differential casing (14) and meshing respectively with said two gears on said drive shaft, said gears being arranged such that said another two gears are disposed adjacent to side ends of said differential casing;

that a collar member (24) is fixedly mounted on said differential casing (14) and includes at its side ends a pair of integral sleeve members (24a, 24b) through which said another two gears (20, 21) are mounted on said differential casing; and that an annular clutch member (23) is slidably but non-rotatably mounted on said collar member (24) and is disposed between said another two gears (20, 21) for coupling said another two gears to said differential casing (14) one at a time through said collar member.

2. A transmission assembly for vehicles comprising a transmission casing (11) which includes a drive shaft (12) extending laterally of said transmission casing and a differential gearing (13) having a differential casing (14) which is driven to rotate by said drive shaft, said differential gearing being adapted to drive left and right wheel axles (15) differentially, said differential casing including a diameter-enlarged portion for housing pairs of differential pinion gears (52) and side gears (53) and a pair of left and right boss portions of a smaller diameter through which said differential casing is rotatably supported by said transmission casing, characterized in:

that a plurality of speed-reducing and -changing gear trains are disposed between said drive shaft (12) and said differential gearing (13), said gear trains being composed of plural gears (17, 18) fixedly mounted on said drive shaft and another plural gears (20, 21) rotatably mounted on said diameter-enlarged portion of said differential casing (14) and meshing respectively with said plural gears on said drive shaft;

that said differential casing (14) is composed of separate left and right casing halves (14a, 14b) which are fastened together with a collar member (24) fixedly sandwiched therebetween; and that an annular clutch member (23) is slidably but non-rotatably mounted on said collar member (24) for coupling said another plural gears (20, 21) to said differential casing (14) one at a time through said collar member.

3. The transmission assembly as set forth in claim 2, wherein each of said casing halves (14a, 14b) and said collar member (24) include integral engaging portions (27, 28) which engage with each other so as to prevent a rotational displacement of said collar member relative to said differential casing (14).

4. A transmission assembly for vehicles comprising a transmission casing (11) which includes a drive shaft (12) extending laterally of said transmission casing and a differential gearing (13) having a differential casing (14)

which is driven to rotate by said drive shaft, said differential gearing being adapted to drive left and right wheel axles (15) differentially, characterized in:

that a plurality of speed-reducing and -changing gear trains are disposed between said drive shaft (12) and said differential gearing (13), said gear trains being composed of plural gears (17, 18; 117, 118, 119) fixedly mounted on said drive shaft and another plural gears (20, 21; 120, 121, 122) rotatably mounted on said differential casing (14) and meshing respectively with said plural gears on said drive shaft;

that an annular clutch member (23; 123) is slidably but non-rotatably mounted on said differential casing (14) for coupling said another plural gears (20, 21; 120, 121, 122) to said differential casing one at a time; and that said drive shaft (12) and said differential gearing (13) are arranged such that center axes of the drive shaft and differential gearing are offset from each other in an axial direction of said transmission casing (11) so as to provide a space (29) within said transmission casing at one side, as viewed in said axial direction, of said drive shaft, a shifter member (30) for operating said clutch member (23; 123) to slide being supported by a support shaft (30) which is disposed within said space (29) and extends laterally of said transmission casing.

5. The transmission assembly as set forth in claim 4, wherein said another plural gears (20, 21; 120, 121, 122) are mounted on said differential casing (14) respectively through sleeve members (24a, 24b; 25, 26; 125, 126).

* * * * *

UNITED STATES PATENT AND TRADEMARK OFFICE
CERTIFICATE OF CORRECTION

PATENT NO. : 5,385,513
DATED : January 31, 1995
INVENTOR(S) : Norihiro Ishii et al.

It is certified that error appears in the above-indentified patent and that said Letters Patent is hereby corrected as shown below:

In the Abstract, line 15, delete "(24a, 25b)" and substitute therefor -- (24a, 24b) --.

In Claim 4, column 14, line 11, after "shaft" delete "(30)" and substitute therefor -- (39) --.

Signed and Sealed this

Eighteenth Day of April, 1995

*Attest:*

BRUCE LEHMAN

*Commissioner of Patents and Trademarks*

*Attesting Officer*